May 22, 1951
R. L. KREYLING
2,554,035
MANUFACTURE OF COMBINED PAPERBOARD AND
SILICATE-CLAY ADHESIVES THEREFOR
Filed Sept 3, 1946
2 Sheets-Sheet 1
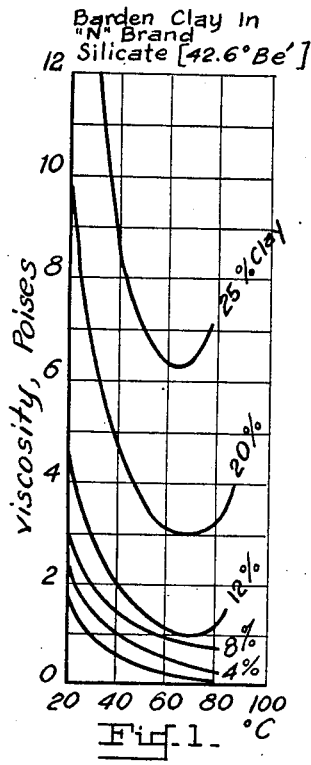
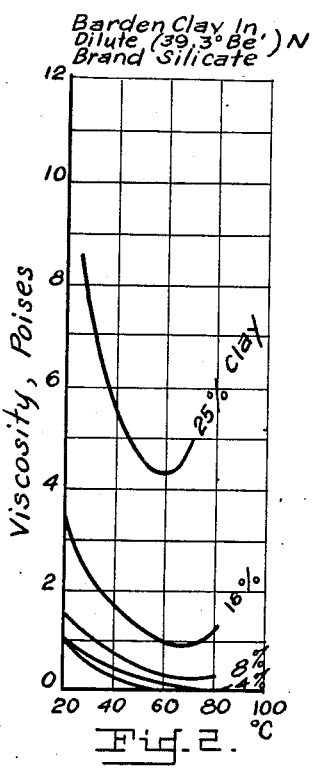
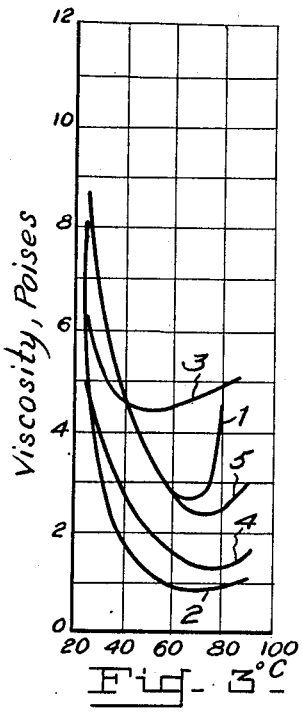
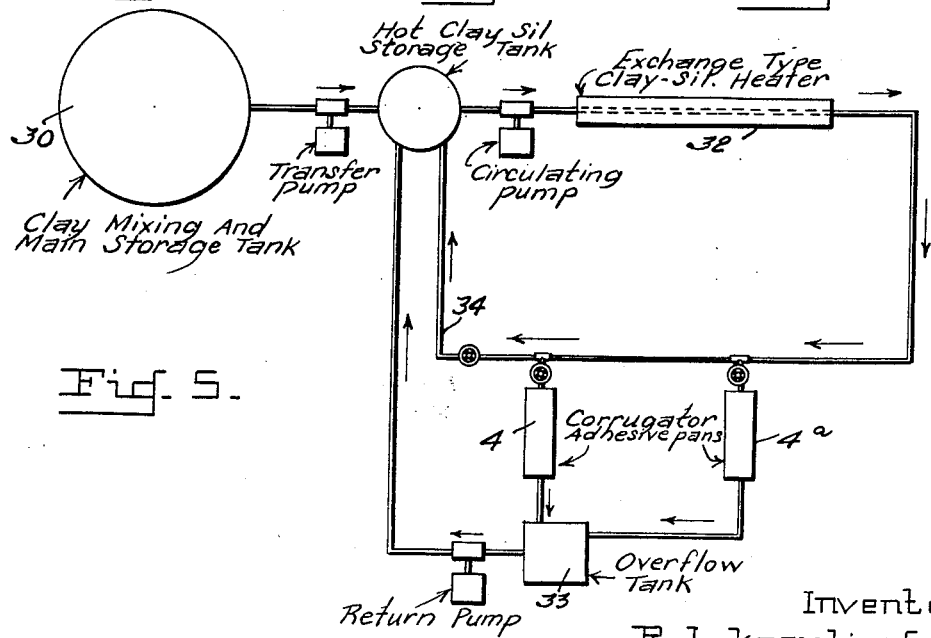
Inventor
R. L. Kreyling
By: Henry C. Parker
Attorney

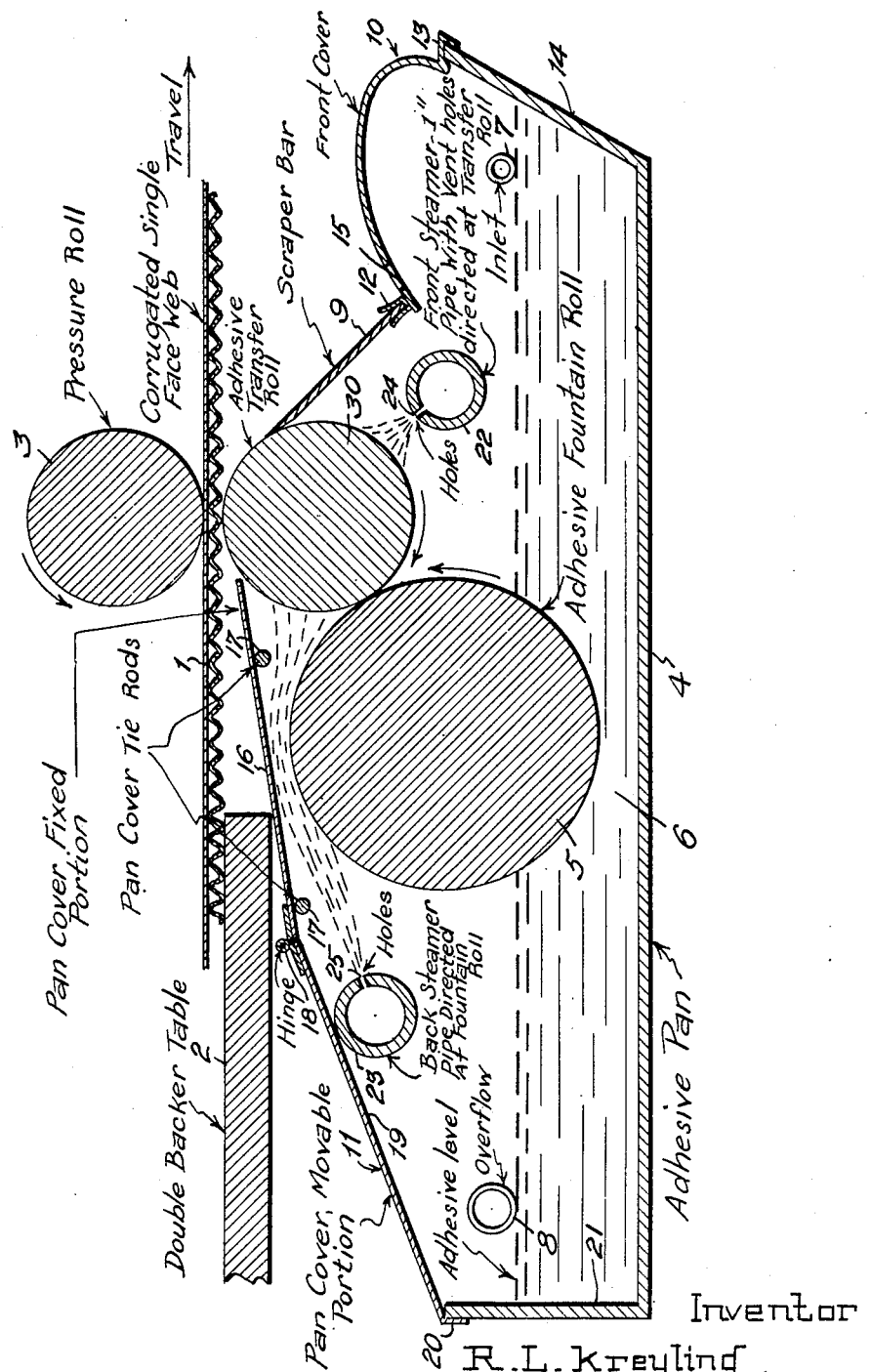

Patented May 22, 1951

2,554,035

UNITED STATES PATENT OFFICE 2,554,035

MANUFACTURE OF COMBINED PAPERBOARD AND SILICATE-CLAY ADHESIVES THEREFOR

Robert L. Kreyling, Parkersburg, W. Va., assignor to Philadelphia Quartz Company, Philadelphia, Pa., a corporation of Pennsylvania Application September 3, 1946, Serial No. 694,533

6 Claims. (Cl. 154—33.05)

1

This invention relates to manufacture of combined paper board and silicate-clay adhesives therefor; and it comprises a novel clay-silicate adhesive and a process of making combined paper board, such as solid fiber container board, corrugated paper board, wall board and the like, making use of said adhesive and one of the conventional high-speed continuous laminating machines. The adhesive of the invention comprises a dispersion of from about 10 to 30 per cent by weight of a fine-grained clay in an aqueous phase comprising an alkali metal silicate having a molecular ratio of $SiO_2$ to alkali metal oxide within the range of about 2.4:1 to 4.2:1, having an aqueous phase viscosity of from about 1 to 8 poises at 20° C. and a gravity of from about 32° to 50° Bé., sufficient undissolved and unreacted clay being present to produce a filter test of from about 0.01 to 3 ml. and an over-all viscosity at 20° C. within the range of about 5 to 15 poises and from about 0.5 to 5 poises at operating temperatures of about 50° to 85° C.; said adhesive having the characteristic property of having an overall viscosity which passes through a minimum value of from about 0.5 to 5 poises within the temperature range of from 50° to 85° C. and which rises with increase of temperature after passing through said minimum, whereby a flash set is produced upon application of said adhesive to a surface preheated to a temperature above that of said minimum. The process of this invention includes the steps of heating and maintaining a body of the described adhesive within the operating range of about 50° to 85° C., advantageously maintaining said body of adhesive under an atmosphere having a partial pressure of water vapor at least as high as that of said adhesive at said operating temperature in order to prevent loss of moisture through evaporation, applying a coating of said heated adhesive to the face of a ply to be united which ply may have been preheated to a temperature which is higher than that of the adhesive but not above about 150° C., applying a second ply over the adhesive coating, which ply has been preheated to a temperature which is higher than that of the adhesive but not above about 150° C., and combining the plies under conditions of heat and pressure; all as more fully hereinafter set forth and as claimed.

Continuous laminating machines have been used commercially for making combined paper board for at least about 50 years. When these machines were first developed they were capable of operating at speeds of only about 10 linear feet per minute. At speeds of this order no difficulties were involved in the choice of suitable adhesives since silicate adhesives were available which would set with ample rapidity for such a purpose. These adhesives soon became standard for this operation owing to their cheapness and to the strong vermin-proof bonds produced. Successive mechanical improvements in the laminating machines have increased the linear speeds of which these machines are capable and within the past few years these improvements have outstripped the advances made in the adhesive field. At the present time, the speed of these machines is limited not by the mechanics of the pasting operation but by the speed of setting of the adhesives used. This fact has produced an important demand for quick setting adhesives and considerable effort has been put forth to develop different types of adhesives suitable for use for the purpose in question.

As machine speeds have been increased so also have the requirements to be met by the adhesives used in the machines. At the present time these requirements are very strict. For example the adhesive must be capable of penetrating the paper to which it is applied but must not penetrate too far since this would result in increased brittleness of board, increased cost of adhesive, danger of strain and increased heat requirements for setting of the bond, as well as the danger of warpage. The critical penetration lies within the range of about 0.002 and 0.004 inch. The adhesive must possess marked thixotropic characteristics. It must be capable of rapidly wetting even heavily sized paper yet must hold to the point of application without spreading appreciably. The over-all viscosity must be sufficient to hold the clay in suspension with a minimum of settling but must not be so low as to cause excessive spreading and penetration. But probably the most important property required in adhesives for high speed fabrication of combined board is that of a short time of set. Straight silicate adhesives have been developed which are capable of producing an initial set upon the evaporation of only about 8 per cent of water. But it has been found that the time required for this evaporation is somewhat too long when these adhesives are used in continuous laminating machines operating at speeds of the order of 150 linear feet per minute or over. There appears to be no evident way of overcoming this difficulty since the heating of these straight silicate adhesives has but little effect on their setting time. It should be noted that at higher temperatures the viscosity-gravity curves are changed in shape, so that their knees are shifted in the direction of higher concentrations and this largely off-sets any advantage gained by the use of more concentrated solutions, which use is possible at the higher temperatures.

An addition of clay to silicate adhesives was first proposed as a means of making these adhesives set more slowly, which is considered an advantage for some purposes. But in a recent patent, No. 2,239,358, Vail and Baker report that high-speed adhesives can be prepared by adding sufficient clay to certain commercial silicate solutions to produce a filter test of from about 4 to 15 cc. and adding sufficient water to produce an aqueous phase having a viscosity of about 0.25 to 1.5 poises and a gravity falling within the range of 30° to 48° Bé., the adhesives being so compounded that their over-all viscosities fall within the range of from 0.5 to 5 poises at room temperatures and that the viscosities and gravities fall on the low-viscosity portions of the knees of their viscosity-gravity curves. It is explained in this patent that straight silicate adhesives which are suitable for use in fabricating machines operating at speeds up to about 150 feet per minute cannot be used at higher speeds owing to their low wetting powers and lack of thixotropic properties, also that the wetting powers of these adhesives cannot be increased by the addition of water without unfavorably increasing their penetrating power.

In the Vail and Baker adhesive, clay is added to lower the penetrating power of the silicate and, when this clay is present, water can be added to increase the wetting power to within the desired range. The clay has the incidental effect of increasing the thixotropic properties of the adhesive. The net result of adding both clay and water to silicate adhesives, as described by Vail and Baker, is to produce an adhesive capable of satisfactory performance at speeds considerably higher than those which can be employed using straight silicate adhesive.

As in the case of the straight silicate adhesives, the Vail and Baker adhesives produce a quick initial set solely because they increase substantially in viscosity upon the evaporation of a few percent of water. It is evident from the disclosure in this patent that these prior inventors considered it disadvantageous or impossible to employ silicate-clay adhesives falling on the knees or the high-viscosity legs of the viscosity-gravity curves owing to the low wetting powers possessed by such adhesives.

I have discovered that it is possible substantially to increase the wetting power of silicate-clay adhesives falling on the knees or the high-viscosity legs of their viscosity-gravity curves by heating them to temperatures of from about 50° to 85° C. and applying them at this elevated temperature. The wetting power is increased by this means to the point at which it is ample for fabricating operations conducted at speeds substantially higher than those for which the adhesives of Vail and Baker are suitable. I have further discovered that a surprising new result can be produced by the heating of certain clay-silicate adhesives, provided that these adhesives are compounded correctly using certain critical proportions etc. In effect these particular adhesives can be converted into heat setting adhesives, that is, into adhesives which increase in viscosity upon heating as well as upon evaporation of water. This is believed to be a new discovery in the art of silicate adhesives and to account for the new results obtained therewith. While I have as yet been unable to determine the maximum speeds at which pasting machines can be operated with my new adhesives, my tests at speeds up to 350 feet per minute indicate that it may eventually be possible to operate some of these machines at speeds approaching 500 or more feet per minute owing to the flash set produced upon the application of heat to my adhesives, this flash set being followed, of course, by a permanent set due to evaporation of water. The final bonds produced are more uniform and substantially stronger than those produced with other silicate adhesives with which I am familiar, a result which I attribute primarily to the heat setting characteristics of my adhesives.

Among the other important advantages secured by the use of these new adhesives is that they result in less warpage of the board. With other adhesives it frequently happens that the combined board warps to such an extent that it is necessary to stack sheets with alternate turning and to allow the board to set up in the stack. With my new adhesive the setting is so rapid and the water content so low that the water absorbed from the adhesive by the board is reduced to a minimum. The bond sets without appreciably affecting the liners and, if the water content of the two liners is controlled so that it is balanced at the double backer glue station, there is no tendency for the board to warp. Attempts are usually made to control warp by preheating and by the length and temperature of the hot plate sections which are intended to restore the balance of the moisture content in the liners. The higher the speed of the machine, the longer and/or the hotter the plate sections usually employed. But when the present adhesives are used, these changes are not required. The bonds are so dry when the board reaches the end of the usual hot plate sections that the board can be cut and immediately fabricated into the final product, the fabrication including slitting, slotting and scoring operations. The use of automatic and conveyor take-offs is made possible and blanks for folding into boxes can be made in one continuous set of operations. This is a result which has long been a desideratum in the art.

Several other advantages are gained by the use of the adhesives of the present invention among which are that corrugated board produced with these adhesives can be successfully ventilated by forced draft through the flutes immediately after gluing; that liners impregnated with asphalt and bitumen can be fabricated without bleeding, owing to the shorter exposure and lower temperatures possible in the hot plate sections; that a saving is effected in the quantity of adhesive employed owing to the better and more uniform bonds produced; that a saving in the investment cost of the machinery is possible owing to the shorter hot plate sections etc., and that the over-all heating costs are reduced. A further advantage is that it is possible to use liners having a higher water content than normal, since the gluing operation is less sensitive to the water content of the liners when the new adhesives are used. This is due to the fact that initial setting is due to an increase of temperature rather than to loss of moisture. These factors enable a saving in storage space and, in times of short paper supplies, mill production can be used promptly.

My invention can be explained more accurately by reference to the accompanying drawing in which Fig. 1 is a plot of several so-called Viscograph curves showing the relationship between viscosity and temperature of several of my adhesives formed with a commercial silicate solution and varying percentages of clay, Fig. 2 is a similar series of curves produced with adhesives formed with a diluted commercial silicate and varying percentages of clay, Fig. 3 shows a series of Viscograph curves for adhesives formed with silicate solutions of different silicate ratios and varying proportions of clay, Fig. 4 is a section through the so-called double backer section and adhesive pan of a continuous laminating machine for producing corrugated paper board, while Fig. 5 is a diagrammatic showing of a lay-out for preparing, heating and circulating adhesive through the pans of a continuous laminating machine.

The curves in Figs. 1 to 3 were prepared with the use of a Recording Viscograph, the principle of which is described in the A. S. T. M. Bulletin of January, 1943 and sold by the Brabender Corporation. This machine is capable of automatically recording the viscosity changes of a liquid when held at constant temperature or when the temperature is raised or lowered at a constant rate. A standard procedure was developed and used in making the curves shown in Figs. 1 to 3. In this procedure the Viscograph cup was filled to about ¾" from its top with the adhesive to be tested, this requiring about 550 mls. The Viscograph head was then lowered to connect with the upper end of the measuring shaft which was first placed in its proper position in the cup. The cooling coil and thermometer were then dipped into the liquid and about 15 mls. of a heavy mineral oil were poured on the surface of the adhesive. The cup was then rotated slowly and the temperature raised to about 85–90° C. following which the heat was turned off, the recorder started and the temperature lowered gradually at a rate of about 1.5° C. per minute by passing cooling water through the coil. The temperature of the adhesive was keyed into the recorded indication of the viscosity and readings of the temperature were taken every 3 to 5 minutes during the cooling period. The addition of the mineral oil was to prevent loss of water due to evaporation during the test. Finally the time and viscosity values were transcribed from the record made by the Viscograph and plotted as degrees C. and poises with the aid of calibration charts.

The curves of Fig. 1 were made with adhesives prepared by adding varying amounts, ranging from zero to 25 per cent of Barden clay, to a commercial silicate solution (known as "N" silicate) having a weight percent ratio of $SiO_2$ to $Na_2O$ of 3.25, a gravity of 41.2° Bé., a viscosity at 20° C. of about 1.6 poises and containing 8.92 per cent of $Na_2O$. The viscosities of the adhesives are plotted as ordinates and the temperatures as abscissas. It will be seen that as the clay content is increased there is a tendency for the curves to pass through a minimum viscosity value, this effect becoming evident in the adhesive containing 12 per cent clay and being more pronounced with the higher clay contents.

The curves in Fig. 2 were made in the same way except that the adhesives used in making these curves were prepared from the same commercial silicate solution which had been diluted by adding about 5 per cent of water to produce a gravity of 39.3° Bé. and a viscosity of 1 poise at 20° C. It will be noted that the curve for the adhesive containing only 8 per cent of clay passes through a slight minimum. But neither this composition nor that containing 16 per cent of clay, the curve for which is shown in the same figure, is satisfactory for use in high speed machines since, as pointed out below, they have too low over-all viscosities and too high filter tests.

I have found that adhesives to be used on high-speed laminating machines must have over-all viscosities within the rather narrow range of 0.5 to 5 poises at some point within the operating temperature range of from about 50° to 85° C. It is evident from the curves of Figs. 1 and 2, therefore, that the minimum permissible clay content of adhesives which exhibit my heat-setting effect and which can be used in high-speed machines lies at about 10 per cent of clay. The curve representing a clay content of 25 per cent in Fig. 2, shows a minimum falling within the operating range of from 0.5 to 5 poises and, with the addition of slightly more water, a clay content of up to about 30 per cent can be used, this representing the upper limit for the clay content of my adhesives. It is also evident, from the curves of Figs. 1 and 2, that the more dilute the silicate solutions, the more clay required in making the adhesives.

Referring to Fig. 3, curve 1 is the Viscograph curve of an adhesive prepared by adding 13 per cent Barden clay to "O" commercial silicate solution, having a gravity of 42.6° Bé., a weight ratio of $SiO_2$ to $Na_2O$ of 3.23, containing 9.22 $Na_2O$ and having a viscosity of 4.2 poises at 20° C. The adhesive of curve 2 was made by mixing 17 per cent Barden clay with commercial "S" silicate, having a gravity of 33.5 Bé., a viscosity at 20° C. of 2.4 poises, a per cent weight ratio of 3.9 $SiO_2$ to 1 $Na_2O$ and containing 6.3 per cent of $Na_2O$. The adhesive of curve 3 was prepared by adding 15 per cent of Barden clay to a commercial silicate solution (known as "U" silicate) diluted to give a gravity of 46.2° Bé., and a viscosity of 6 poises at 20° C., having a per cent weight ratio of 2.4 $SiO_2$ to 1 $Na_2O$ and containing 12.3 per cent $Na_2O$. The adhesive of curve 4 was made by adding 19 per cent of Barden clay to a potassium silicate solution, containing 12.6 per cent $K_2O$, having a gravity of 40.8° Bé., a viscosity at 20° C. of 7.5 poises and a per cent weight ratio of 2.1 $SiO_2$ to 1.0 $K_2O$. The adhesive of curve 5 was prepared by adding 17 per cent of Barden clay to a commercial sodium silicate solution (known as "Stixo DD" silicate), having a gravity of 39.9° Bé., a viscosity at 20° C. of 3.3 poises, containing 8.4 per cent $Na_2O$ and having a per cent weight ratio of 3.4 $SiO_2$ to 1 $Na_2O$.

It has been determined from the curves of Fig. 3 and other similar curves, as well as from practical operating experience, that the critical range of silicate ratios by weight useful in making the adhesives of the present invention lies between about 2.4:1 to 4:1 for the sodium silicate adhesives. For potassium silicates the corresponding range of per cent $SiO_2$ to $K_2O$ is from about 2.0:1 to 2.6:1.

Another factor which I have found to be critical in the case of adhesives suitable for high speed laminating machines is the so-called filter test which is described in the acknowledged Vail and Baker patent, No. 2,239,358. I have found that the filter test for my new adhesives must not exceed about 3.5 ml. The preferred range is between about 0.01 to 3.0 ml. Some adhesives having substantially a zero filter test are satisfactory, provided that they penetrate the filter paper at least enough to wet the glass, and some having filter tests up to about 3.5 are useful.

In addition I have found that the viscosity of the liquid phase of my adhesives should lie between about 1 to 8 poises at 20° C., with the higher viscosities occurring at the lower silicate ratios; also that the gravity at 20° C. should be between 32° and 50° Bé. But the most characteristic and necessary property of the new adhesives is that their viscosities pass through minimum values, lying below 5 poises, within the temperature range of 50° to 85° C.

Operating tests have shown that adhesives having over-all viscosities below 5 poises at 20° C. are not suitable for high-speed fabrication when used in the temperature range of 50° to 85° C. The adhesives containing 8 and 16 per cent Barden clay, whose curves are shown in Fig. 2, have viscosities at 20° C. below 5 poises and also have filter tests well above 3.5, so these particular adhesives fail in two respects to conform to the adhesives of the present invention. It should be noted however, that, if Chicora clay is substituted for the Barden clay, a suitable adhesive can be made using a clay content of about 17 to 18% and "N" silicate diluted to a gravity of 39.3° Bé. Chicora clay is better, apparently because it has a finer grain.

It should be noted that the adhesives described in the acknowledged Vail and Baker patent have lower liquid phase and over-all viscosities and are more dilute than those of the present invention. The Vail and Baker adhesives also have a higher filter test. The adhesives of the present invention are made using commercial silicate solutions with a maximum of only about 10 per cent of water added. The Vail and Baker adhesives could not be used at temperatures of 50° to 85° C. since they would show far too high a penetration owing to the fact that their viscosities would be too low at these temperatures and/or because their clay contents would be too low. Moreover these prior adhesives do not exhibit the phenomenon of passing through a minimum viscosity within the temperature range of 50° to 85° C. which is essential in the production of setting upon the application of heat. This effect occurs only in the case of adhesives whose liquid phase compositions are such that they fall on the knees or the high-viscosity legs of their viscosity-gravity curves and which also contain an amount of fine grained undissolved clay, depending upon the $Na_2O-SiO_2$ ratio and the dilution, but at least about 10 per cent clay.

The adhesives of the present invention can be used in the conventional high speed laminating machines provided that heated adhesive pans are provided. However, some difficulties arise from the skinning over of the adhesives and the formation of rings and silicate deposits on machine parts due to the rapid evaporation of moisture from the hot adhesives. I have found that these difficulties can be eliminated by enclosing the adhesive pans and/or by maintaining an atmosphere over the adhesive having a partial pressure of water vapor at least as high as that of the adhesive at the operating temperature in order to prevent loss of moisture from the adhesive. A suitable apparatus for this purpose is shown in Fig. 4 of the accompanying drawing.

Fig. 4 is a section through the adhesive pan of the so-called double backer section of a high-speed corrugated paper machine at which station the corrugated single face web receives an application of adhesive on the exposed face of its corrugated ply just prior to the combining of this face with a liner. Referring to the figure, the single face web is shown at 1 as it passes from left to right in the figure from the heated double backer table 2 between the pressure roll 3 and the adhesive transfer roll 30. The adhesive pan is shown at 4. The adhesive fountain roll 5 is journaled in the lateral walls of the pan and is mounted so that it dips into the adhesive 6. The transfer roll picks up adhesive from this fountain roll and applies it to the tips of the corrugations of the web 1. The spacing between rolls 3 and 5 is adjustable and the quantity of adhesive applied to the corrugations can be controlled by means of this adjustment. The scraper bar 9 removes excess adhesive from the transfer roll. The adhesive enters the pan through the pipe 7 and leaves by the overflow 8, a continuous flow through the pan being provided.

The apparatus elements described above are conventional for the double backer gluing station. But in accordance with the present invention the adhesive pan is advantageously enclosed by means of a front cover and rear cover, shown generally at 10 and 11, respectively. The front cover is removably secured at its rear edge by means of clip 12 and at its forward edge by means of a bent portion 13 which fits over the top of the front wall 14 of the adhesive pan as shown. This pan is provided with openings 15 near the clip 12 through which the excess adhesive scraped off the transfer roll by the scraper bar is returned to the pan.

The rear cover is formed with a fixed portion 16 supported by tie rods 17. This fixed portion is connected by hinge 18 to a swinging part 19 whose outer edge is bent downwardly at 20 to fit over the top of the rear wall 21 of the pan. In order to provide a controlled atmosphere above the adhesive, it is advantageous to provide perforated steam pipes beneath the covers adapted to spray the adhesive rolls with steam. The forward pipe 22 sprays steam on the underside of the transfer roll while the forward pipe 23 sprays steam along the top of the fountain roll and into the space above and between the two rolls. These pipes are provided with a series of holes 24 and 25, respectively, which may be spaced apart a distance, such as 1½ inches, for example, and which may vary in diameter from about 0.0265 to 0.097 inch. The valves controlling the steam pipes are advantageously set so that the entire space beneath the covers is filled with water vapor and that a small amount of mist escapes from the pan. It is advisable to measure the gravity of the circulating adhesive from time to time and to control the steam supply so that this gravity remains constant. Adhesive pan covers and steam pipes of similar type are also advantageously provided for the single facer glue pan and rolls. For the purposes of the present invention it is also advantageous to reduce the size of the conventional glue pan used in laminating machines. For example, the pan need extend for a distance of no more than 3 inches back of the fountain roll. This reduces the area of the adhesive exposed in the pan and increases the rate of circulation, both of which are desirable.

An equivalent means for preventing or retarding evaporation of water from the surface of the adhesive in the pan is to provide over its surface a layer of mineral oil or other non-volatile inert liquid. It is advantageous to employ a liquid which does not preferentially wet the metal adhesive rolls in which case no provision need be made to prevent the liquid from coming into contact with the rolls. But it is possible to prevent such contact by the use of baffles on either side and close to the fountain roll so that the bath portion into which this roll dips is free from the inert liquid which, however, covers the remaining portion of the adhesive in the pan.

In Fig. 5 there is shown a layout of adhesive pans and tanks which is advantageous in connection with the present invention. The descriptive legends on this figure are believed to make the layout clear. As shown the adhesive is made up in a large mixing tank 30 from which point it is transferred to a hot adhesive storage or circulation tank 31. It is then pumped through a heater 38 and into and through the adhesive pans 4 and 4a after which it is collected in an overflow tank 33 and pumped back to the storage tank. The adhesive pans are connected in parallel. This is advantageous in order better to control the temperature. A by-pass line 34 is provided through which the adhesive can be passed directly from the heater back to the circulation tank at times when the adhesive pans are being cleaned, for example. Valves are provided in all lines as indicated in order to control the flow of adhesive.

The following specific examples describe results obtained in practical operating embodiments of my process using the new adhesives:

*Example 1*

The tests of this example were conducted at a plant which was having difficulty in running corrugated board with a 30 point liner and a concentrated straight silicate adhesive. The bond was damp at the cut-off and it was necessary to allow the board to set up in the stack. The highest speed at which the board could be laminated was 180 feet per minute, with full steam pressure of 137 pounds gauge on hot plate and heating rolls and even though the double backer liner was preheated until the surface to be glued reached a temperature of 121° C. The liner had a temperature of 116° C. at the cut-off.

In the first test conducted in this plant an adhesive corresponding to that described by Vail and Baker was used, made by mixing 12% Chicora #3 clay with 7 per cent water and 81 per cent of "N" silicate (ratio 3.22 $SiO_2$ to 1 $Na_2O$). This adhesive has a gravity of 38.7° Bé., a filter test of 10.7 ml. and a viscosity of 1.3 poises at 20° C. which fell on the low viscosity leg of the "knee" of its viscosity-gravity curve. The liquid phase viscosity of this adhesive was 0.7 poise at 20° C. The results obtained with this adhesive were slightly better than with the straight silicate adhesive used previously but were still not satisfactory. It should be noted that this adhesive could not be used within the temperature range of from 50° to 85° C., as in the case of the present invention, owing to the fact that its viscosity would be too low and its penetrating power too high.

In a second test an adhesive was used of the new type containing 16 per cent Chicora clay, 2 per cent of water and 81 per cent of "N" silicate. This adhesive gave a filter test of 3.0 ml. and had an over-all viscosity of 5.0 poises at 20° C., which viscosity passes through a minimum value of about 1.7 poises at 65° C. and falls on the high-viscosity side of the "knee" of its viscosity-gravity curve. It has a liquid phase viscosity of 1.5 poises at 20° C. An open glue pan was used and it was found best not to heat this above about 50° C. owing to difficulties from skinning over in the pan. This adhesive gave acceptable handling properties and satisfactory operating performance. When 16 point Kraft liners were used, the gauge pressure on the hot plate section could be reduced to 20 pounds and a speed of 205 feet could be maintained without warping of the board. High speed operation was also possible with 40 pounds gauge steam supply when 30 point liners were used, and warp could be avoided. The steam saving in this test amounted to one-third of that normally required for the double-face section.

In a third test with the same equipment an adhesive was prepared by mixing 17 per cent of Huber's Suprex #2 clay with 83 per cent of "N" silicate which contained 8.8% $Na_2O$ at a $SiO_2$ to $Na_2O$ ratio of 3.22. The liquid phase of the adhesive had a viscosity of 1.8 poises and a gravity of 40.8° Bé. The filter test was 2 ml. and the over-all viscosity was 8.5 poises at 20° C., this viscosity falling to a minimum of about 2 poises at a temperature of 65° C. When used to glue 16 point liners at 17 pounds gauge of steam pressure and with the adhesive heated to a temperature of about 50° C. the board scored satisfactorily at 250 feet per minute. However, it was necessary to reduce this speed because the starch bond used on the single facer did not set properly at this speed. A 30 point liner was set and scored satisfactorily at 60 pounds gauge and 230 feet per minute. In this test, it was found possible to use lower clearance between the adhesive rolls with consequent saving of glue over the straight silicate used previously. The edges and scores of the sheets were well stuck and the final sheets were so flat that they did not require alternate piling as is necessary when warping occurs. With the adhesives used successfully in these tests, the bond set in ¼ of a minute or less which was about ½ of the time required for the ordinary adhesive set.

*Example 2*

In this test an adhesive was prepared by mixing 14 parts of Barden clay with 86 parts of a sodium silicate solution containing 8.2% $Na_2O$ at a ratio of $SiO_2$ to $Na_2O$ of 3.4:1. The adhesive had a filter test of 2 ml. and an over-all viscosity of 5.4 poises at 20° C. Its liquid phase had a viscosity of 2.3 poises and a gravity of 39.5° Bé at 20° C. The temperature in the pan was approximately 65° C. and 23 point jute liners, described as 135 pound test and 84 pounds per thousand square feet, were used successfully at 216 feet per minute. The adhesive pan was covered in this test and no trouble was encountered from skinning over or deposits collecting on the rolls. A flatter board was produced than that obtained with the ordinary silicate clay adhesive used previously. With the new adhesive, the glue roll clearance was cut from 0.011 to 0.009 inch and 85 thousand linear feet was run in one shift. The board could be fed faster through the printing presses because it was flatter than that produced previously. The double backer on which the new adhesive was used could be run faster than the single facer on which an ordinary adhesive was being used. The week's run using this hot clay-silicate adhesive gave the highest production ever recorded for that period in this plant.

Example 3

In this test an adhesive of the same composition as that used in the previous example was employed, except that Green Stripe Clay, N. Clark & Sons, California, replaced the Barden clay. The temperature of the adhesive in the pans was 60° C. The adhesive was used with covered pans and steamers at the double backer glue station. The normal top speed of the corrugating machine, using the new adhesive was 200 feet per minute, which was as fast as the men were willing to handle the board at the take-off. When the machine was speeded up to 300 feet a minute for a few minutes, performance was just as satisfactory. The board produced was firmer than the starch board ordinarily made and it was found that the hot plates were cleaned easily of the small accumulations which occurred. In addition the board was exceptionally flat and free from warp so that it was satisfactory for use with an automatic take-off. It did not require turning the board produced. Both 16 and 23 point liners were used.

Example 4

In this example an adhesive was prepared with 16 parts Chicora clay #3 from J. N. Huber Company of New York City, 1 part water and 83 parts of "Stixo DD" sodium silicate having a weight ratio of 3.4 $SiO_2$ to 1 $Na_2O$ and 8.2% $Na_2O$. The liquid phase had a viscosity of 2.5 poises and a gravity of 39.4° Bé. The adhesive had a filter test of 0.05 ml. and an over-all viscosity of 10.0 poises at 20° C. At a speed of 220 feet per minute and a temperature of the adhesive in the glue pan of 54° C., it was found that the bond would set in 0–¼ of a minute compared to ¼–½ of a minute for the straight silicate adhesive previously used. The steam in the hot plate sections varied from 140 pounds gauge to 28 pounds gauge and provided plate surface temperature of from 173° C. at the beginning to 127° C. at the end of the section. The paper temperature itself varied from 79° C. at the beginning of the hot plate section to 71° C. at the end of the cooling section. In another test using this same adhesive, it was found that the glue set satisfactorily at 245 feet per minute when the adhesive's temperature was about 60° C. The improvement in setting speed became less as the adhesive temperature decreased. Below about 50° C. it fell off quite rapidly and at 27° C. it was about equivalent to the straight silicate. The adhesive was evidently capable of use at a speed higher than 245 feet per minute but higher speeds could not be used because of mechanical difficulties with the machine.

Example 5

In this example a mix, containing 81 parts of "Stixo DD" sodium silicate, having 8.3% of $Na_2O$ and an $SiO_2$ : $Na_2O$ ratio of 3.4 : 1, 17 parts of Chicora #3 clay and 2 parts of water, was used on both the single facer and double backer glue pans which were provided with covers and steamers. The liquid phase had a gravity of 39.9° Bé. and a viscosity of 3.4 poises at 20° C. The over-all viscosity at 20° C. was 15 poises and the filter test was 0.01 ml.

This particular machine was run ordinarily at 85 feet per minute using a straight silicate adhesive. When the adhesive of the present invention was substituted, it was found that, with the adhesive heated to 55° C. and the machine running at 135 feet per minute, 1.5 minutes were required for set. At a temperature of 60° C. and at 160 feet per minute, only 20 seconds were required for set. A better set was obtained with a lower spread of adhesive. A firmer and lighter board was produced at a higher speed than was the normal practice with this machine.

Example 6

In this experiment 13.5 parts of Barden clay was mixed with 1.7 parts water and 84.8 parts of "Stixo DD" sodium silicate having a silicate ratio of 3.4:1. This silicate solution had a gravity of 39° Bé. and a viscosity of 1.9 poises. At 20° C. the viscosity of the final mix was 5.9 poises and the filter test was 1.1 ml. The adhesive was heated to 67° C. and a satisfactory flat board was produced. The adhesive showed a penetration of 0.003 inch into the paper surface. At 78° C. the penetration was from 0.002 to 0.003 inch and a faster set was obtained than at 67° C. The adhesive was used only on the double backer. A slight reversed warp was observed. When the adhesive was used at 84° C. a slight reversed warp was again observed with only 0.0015–0.0025 inch penetration. In these experiments, high speeds could not be obtained because the corrugated medium was an inferior straw which could not stand the strain of such velocities.

Example 7

In this example an adhesive was prepared by mixing 16.4 parts of Barden clay with 83.6 parts of "S" sodium silicate solution containing about 6.5 per cent of $Na_2O$ and having a silicate ratio of about 3.9:1. The liquid phase had a gravity of about 34° Bé. and a viscosity of about 7.0 poises. The over-all viscosity was about 13.0 poises and the filter test was 0.01 ml. This adhesive was used on the same machine as in Example 6. When heated to 65° C. the operation was not quite as successful as in the case of the adhesive used in Example 6, but when heated to 76° C. it was found that there was less tendency to form a skin and the adhesive was somewhat more efficient than that of Example 6. The clay used in making the adhesives of the above specific examples obviously remains undissolved and unreacted in the adhesives. It is evident from the above examples that the over-all viscosities of my adhesives, which fall within the range of from 5 to 15 centipoises, vary inversely with the filter test values, which fall within the range of from 0.01 to 3 ml., that is, the high viscosities go with the low filter tests.

While I have described what I consider to be the most advantageous embodiments of my adhesive and process of using it, it is evident, of course, that various modifications can be made in the specific procedures and compositions disclosed without departing from the purview of this invention. Thus, while most of the adhesives described have been sodium silicate adhesives, it is also possible to make my adhesives from other alkali metal silicates, such as potassium and caesium for example, all of which have viscosity-temperature curves similar in shape to those shown in the drawing. As pointed out previously the more important factors to control in the making of adhesives in accordance with the present invention are (1) to employ as an aqueous phase an alkali metal silicate solution having a gravity within the range of about 32° to 50° Bé. and a molecular ratio of $SiO_2$ to alkali metal oxide ranging from about 2.4:1 to 4.2:1, whose viscosity falls within the range of about 1 to 8 poises at 20° C., the higher viscosities being employed with the lower silicate ratios, the viscosity and the gravity of the liquid phase of said adhesive falling on its viscosity-gravity curve on the portion extending from the knee to a maximum value of about 8 poises and 50° Bé., (2) to add sufficient colloidal clay (within the range of 10 to 30 per cent by weight) to produce a filter test of from about 0 to 3.5 ml. and (3) to compound the adhesive so that its over-all viscosity is within the range of about 5 to 15 poises at 20° C. and 0.5 to 5 within the operating temperature range of 50° to 85° C. The most characteristic property of the adhesives prepared within these limits is that they have a viscosity which passes through a minimum within the temperature range of 50° to 85° C., which minimum is within the range of from about 0.5 to 5 poises. These adhesives also have the property of increasing enormously in viscosity upon the loss of moisture. This is evident from the curves shown in the drawing of No. 2,239,358. It is evident from these curves that compositions which fall on the "knee" or the high viscosity legs of the viscosity-curves increase in viscosity more rapidly than the Vail and Baker adhesives whose compositions fall on the low viscosity legs of these curves. But, as pointed out previously, my new adhesives increase in viscosity even more rapidly than would be indicated from these curves due to the heat-setting effect produced upon applying the adhesives to a liner which is pre-heated to a temperature above that of the minimum viscosity of the adhesive. Adhesives made in accordance with the present invention have too low wetting powers to enable their use on high-speed laminating machines at ordinary temperatures. But, upon heating to within the operating range of from 50° to 85° C., results are obtained which exceed those obtained with any other silicate adhesive with which I am familiar.

The optimum operating viscosity varies to some extent with the type of paper and even with the machine used. For example, I have found that with the usual type of corrugating machine the optimum viscosity usually lies within about 1 to 2 poises at operating temperatures while in the case of machines for producing solid paper board somewhat higher viscosities within the range of 2 to 5 poises are usually more advantageous. The viscosity can be controlled by changing the clay content, by using a clay of different type and/or by employing a silicate of different viscosity.

The clay to be used in making my adhesives should be of a fine grained type. Clays of the ball type, China clays, bentonite, attapulgite, asbestos etc. have been found satisfactory. But I usually prefer to use the kaolin type clays found in South Carolina, since these clays produce excellent adhesives and are cheaper and more readily available. While the clay content may vary between about 10 to 30 per cent by weight, the optimum proportions are usually found within the narrower range of from 12 to 25 per cent. The more colloidal the clay, the less required. The clay employed should be free from grit to prevent wear on the machinery used in applying the adhesive.

The optimum gravity of the aqueous phase is about 33° to 44° Bé. while the optimum silicate ratio by weight for sodium silicate adhesives is from about 3.2 $SiO_2$ : 1 $Na_2O$ to 3.9 $SiO_2$ : 1 $Na_2O$. Generally the higher the silicate ratio the more clay permitted in the adhesive and the greater the reduction in viscosity upon heating. The concentration of the silicate in the adhesive can be defined best by the viscosity and gravity of its aqueous phase. Most of the usual commercial silicates having silicate ratios within the ranges stated can be used undiluted as the aqueous phase of my adhesives. The maximum quantity of water which can be used to dilute these commercial adhesives is usually about 10 per cent by weight. Of course, the adhesives can be prepared from solid silicates having silicate ratios within the range specified.

While a considerable degree of skill is required to compound the adhesives of the present invention, it is believed that the disclosure which has been given will be ample to enable those skilled in the art to prepare satisfactory adhesives. The procedures used in compounding the adhesives are conventional and will depend to a large extent upon the equipment available, the relative cost of raw materials and other considerations.

The method of the present invention involves the steps of heating an adhesive of the type described to within the temperature range of about 50° to 85° C., coating a ply, which advantageously may have been preheated to the temperature of the adhesive or higher but not above 150° C., with the hot adhesive and uniting said ply with a second ply, which has been preheated to a temperature above that of the adhesive, preferably within the range of about 90°–150° C., under conditions of heat and pressure. The hot adhesive is advantageously maintained under an atmosphere having a partial pressure of water vapor which is at least as high as the partial pressure of the adhesive at the temperature employed and the adhesive rolls are advantageously sprayed with steam to prevent accumulations of adhesive thereon. In the making of corrugated paper, it is also advantageous to ventilate the flutes by passing air therethrough to eliminate moisture. Other modifications of this invention which fall within the scope of the following claims will be immediately evident to those skilled in the art.

What I claim is:

1. A clay-silicate adhesive which when heated to temperatures of from about 50° to 85° C. is suitable for use on high-speed laminating machines, which comprises from about 12 to 25 per cent of a colloidal clay dispersed in an aqueous phase comprising a sodium silicate solution having a per cent by weight ratio of $SiO_2$ to $Na_2O$ within the range of about 3.2:1 to 3.9:1, having a viscosity of from about 1 to 8 poises at 20° C. and a gravity of from about 33° to 44° Bé., sufficient clay being present to produce a filter test of from about 0.01 to 3 ml. and an over-all viscosity at 20° C. of from about 5 to 15 poises, the over-all viscosities varying inversely with the filter tests within the ranges set out, the aqueous phase viscosity and the silicate ratio of the adhesive being so correlated that the lower viscosities occur with the higher silicate ratios; the aqueous phase viscosity and the silicate ratio of the adhesive being so correlated that the lower viscosities occur with the higher silicate ratios; the composition of the aqueous phase of said adhesive being such that its viscosity and gravity fall on its viscosity-gravity curve along that portion which extends from the knee to maximum values, falling on the high viscosity leg of said curve, of about 8 poises and 44° Bé.; the gravity and the silicate ratio being so correlated that the higher gravities occur with the lower silicate ratios; said adhesive having the characteristic property of having an over-all viscosity which even without loss of moisture passes through a minimum value of from about 0.5 to 5 poises within the temperature range of from 50° to 85° C. and which rises with increase of temperature above said minimum whereby a flash set is produced upon application of said adhesive to a surface which is preheated to a temperature above that of said viscosity minimum; the clay content of the adhesive being undissolved and unreacted.

2. The adhesive of claim 1 wherein the silicate ratio and the clay content are so correlated that the higher the silicate ratio, the more clay is present within the ranges stated.

3. In the manufacture of corrugated paper board on a high-speed corrugating machine, the process which comprises maintaining a body of the adhesive of claim 1 at a temperature within the range of from about 50° to 85° C. while retarding the evaporation of water from the surface of said body, transferring said heated adhesive to the tips of the corrugations of a ply to be laminated, applying another ply, which has been preheated to a temperature within the range of about 90°–150° C., over said adhesive and uniting said ply with the corrugated ply by the application of heat and pressure.

4. The process of claim 3 wherein said body of adhesive is maintained under an atmosphere having a partial pressure of water vapor at least as high as that of said adhesive at said temperature in order to retard evaporation from its surface.

5. The process of claim 3 wherein evaporation of water from the body of adhesive is retarded by providing a layer of non-volatile inert liquid on top of said body of adhesive.

6. The process of claim 3 wherein the adhesive is applied to the corrugations by means of rolls and steam is sprayed on the rolls to prevent accumulations of adhesive thereon.

ROBERT L. KREYLING.

REFERENCES CITED

The following references are of record in the file of this patent:

UNITED STATES PATENTS

| Number | Name | Date |
| --- | --- | --- |
| 1,015,385 | Hahn | Jan. 23, 1912 |
| 1,504,218 | Crowell | Aug. 12, 1924 |
| 1,629,511 | Kramer et al. | May 24, 1927 |
| 2,236,056 | Grimm | Mar. 25, 1941 |
| 2,239,358 | Vail | Apr. 22, 1941 |
| 2,287,410 | Boller | June 23, 1942 |
| 2,287,411 | Boller | June 23, 1942 |